Feb. 28, 1961  J. P. GIBBS  2,973,496
TRANSDUCER
Filed March 14, 1960  4 Sheets-Sheet 1
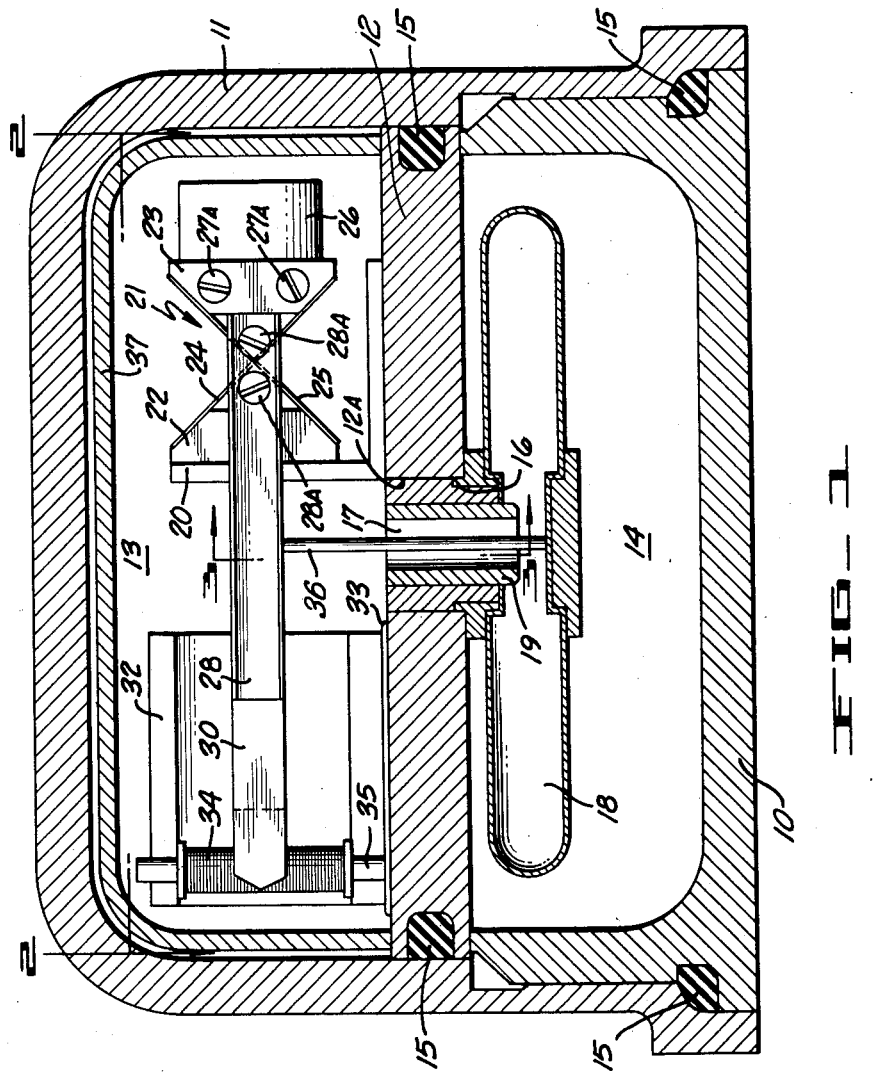
FIG_1
JOSEPH P. GIBBS
INVENTOR.
BY Christie Parker & Hale
ATTORNEYS

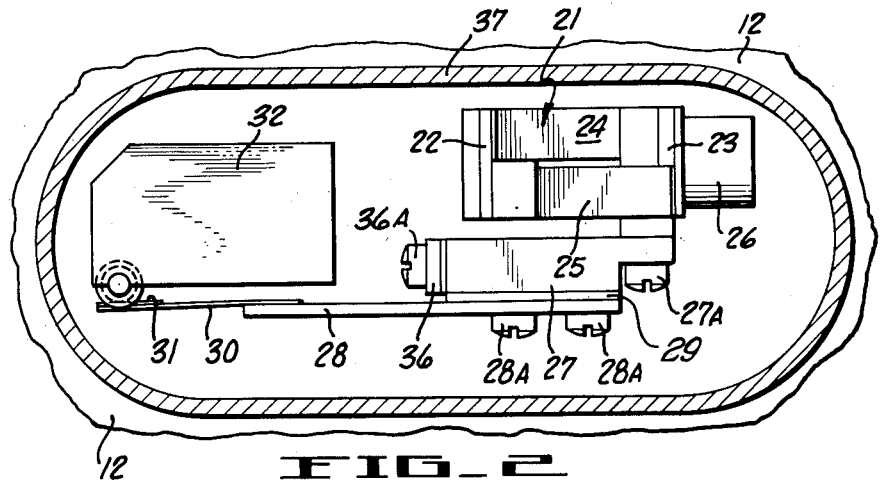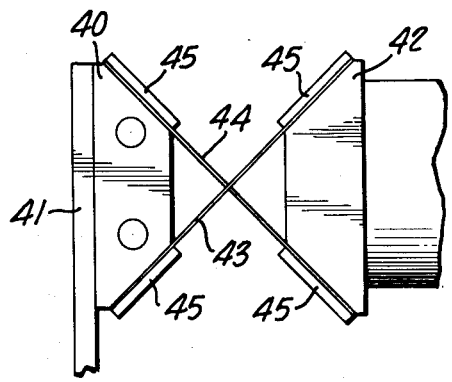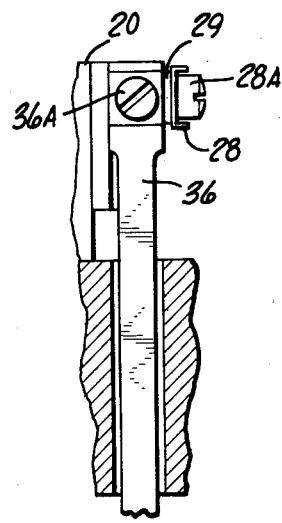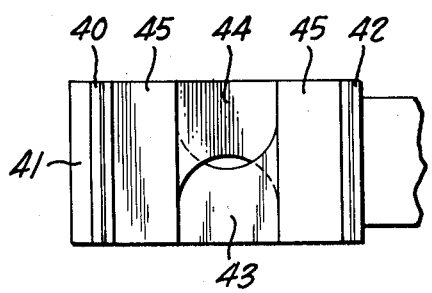
Joseph P. Gibbs
INVENTOR.
BY Christie Parker & Hale
ATTORNEYS

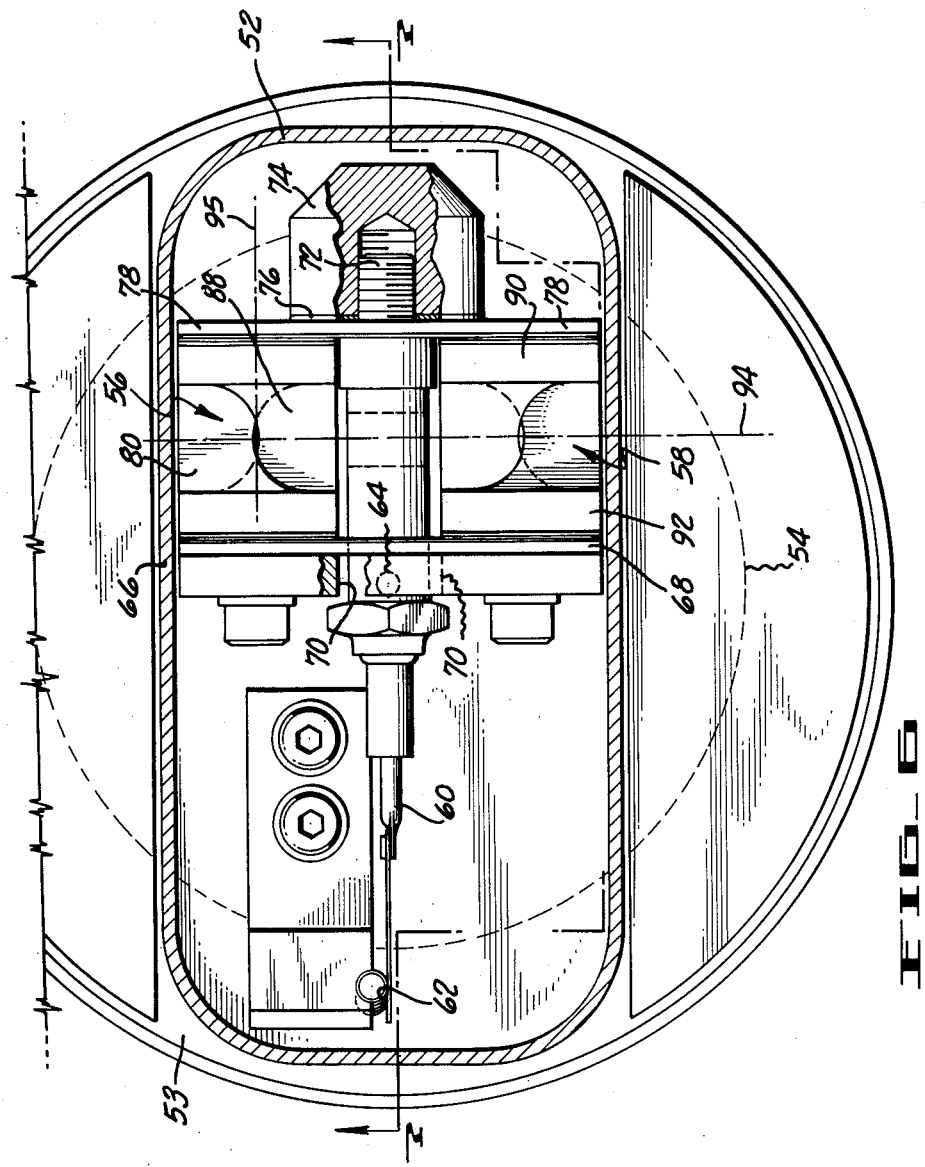

Feb. 28, 1961  J. P. GIBBS  2,973,496
TRANSDUCER
Filed March 14, 1960  4 Sheets-Sheet 4
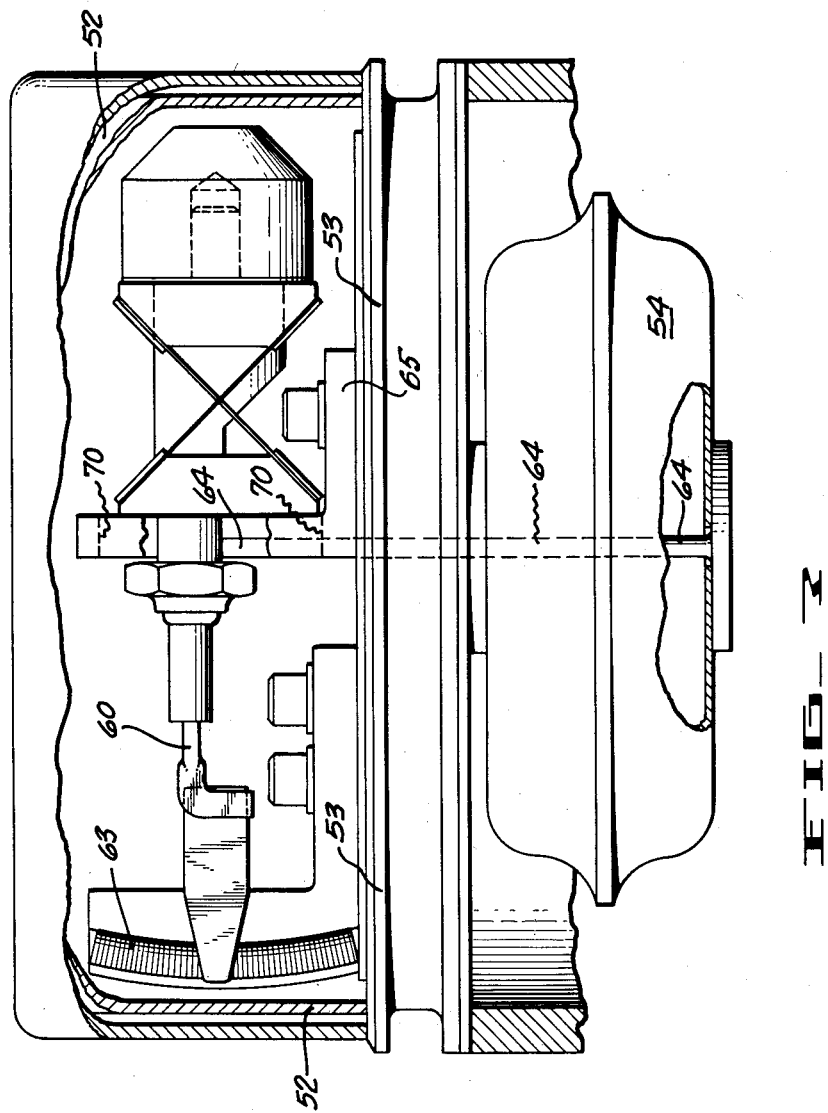
JOSEPH P. GIBBS
INVENTOR.
BY
ATTORNEYS United States Patent Office 2,973,496
Patented Feb. 28, 1961

2,973,496

TRANSDUCER

Joseph P. Gibbs, Arcadia, Calif., assignor to Consolidated Electrodynamics Corporation, Pasadena, Calif., a corporation of California Filed Mar. 14, 1960, Ser. No. 14,713

4 Claims. (Cl. 338—41)

This invention relates to the measurement of forces and particularly to a pressure transducer in which the effects of vibrational and accelerational environments are minimized, and is a continuation-in-part of my copending application Serial No. 746,718, filed July 7, 1958, now Patent No. 2,931,994.

In a pressure transducer, a transduction system is provided whereby pressure-induced mechanical deflections of a pressure responsive element are transmitted to a displacement sensing device from which an electrical output is produced responsive to the magnitude of the pressure-induced deflections. The electrical output can be recorded to provide a measure of the pressure variations, or it can be used to actuate a compensating adjustment where, as in control applications, a compensating response is required as a function of variations in pressure.

In many systems employing pressure transducers as, for example, those utilized in aircraft and missiles, it is particularly important that the pressure transducer exhibit minimum response to vibrational and accelerational environments. Furthermore, this insensitivity to spurious environments must be achieved consistent with minimum size and weight and maximum simplicity of the pressure transducer.

The present invention provides a pressure transducer in which the parameters of size, weight and simplicity are made optimum while a minimum response to vibration and acceleration is achieved. The present invention is a pressure sensing transducer including a housing, pressure responsive means mounted in the housing for displacement in response to pressure changes, and displacement sensing means. A lever arm is maintained in displaceable relationship relative to the displacement sensing means and is associated with means operable to transmit a force to it responsive to displacements of the pressure responsive means. A pair of crossing springs, connected at one end to rigid support means and at their opposite end to the lever arm, suspends the arm for pivoted movement in opposition to the supporting springs. A balancing mass is mounted at the pivoted end of the lever arm.

The pair of crossing springs constitutes a cross-flexure on which the lever arm is pivoted. The cross-flexure suspends the lever arm so that a low response to acceleration and vibration is attained. In addition, the cross-flexure minimizes errors of hysteresis and friction and allows a high degree of linearity between pressure-induced displacements of the pressure responsive means and the sweep of the lever arm.

A potentiometric system is particularly useful as a displacement sensing means in the pressure transducer of the present invention since a potentiometric system provides a high level electrical output without the need of impedance matching or signal amplifying equipment. Therefore, while other suitable displacement sensing means may be adapted for use, as, for example, a differential transformer, the transducer of the present invention is described as utilizing a potentiometric system in combination with the pressure responsive means. A pressure transducer having minimum size and weight and maximum simplicity is thereby obtained.

The operation of the transducer of this invention in severe acceleration environments is improved by supporting the lever arm with two pairs of crossing springs, the pairs of springs being disposed on opposite sides of the lever arm. Such an arrangement substantially increases resistance to lateral displacement of the lever arm from its pivot axis when the instrument is subjected to high acceleration forces in a direction which tends to lift the arm out of the plane in which it normally pivots.

This is particularly important when the lever arm is arranged to slide a contact along a potentiometer winding, because it prevents the contact from being lifted from the winding and hammered against it, which would result not only in intermittent electrical continuity, but also in peening of the winding.

The transducer according to the present invention as well as its advantages and manner of use will be better understood from the following detailed description thereof made in conjunction with the accompanying drawings in which:

Fig. 1 is a sectional elevation of an embodiment of the transducer according to the invention;

Fig. 2 is a fragmentary plan view generally taken along lines 2—2 of Fig. 1;

Fig. 3 is a fragmentary view generally taken along line 3—3 of Fig. 1;

Fig. 4 is a fragmentary elevation of another embodiment of a cross-flexure for use in the transducer according to the invention;

Fig. 5 is a plan view of the embodiment of the cross-flexure shown in Fig. 4;

Fig. 6 is a fragmentary view similar to that of Fig. 2 of an embodiment in which two pairs of crossed springs are used to support the lever arm; and Fig. 7 is a view taken on line 7—7 of Fig. 6.

With reference to Figs. 1, 2 and 3, a cylindrical base 10 having a hollowed-out interior section is joined as by threads to a cylindrical outer housing 11. The housing also defines a hollowed-out interior. A cylindrical mounting plate 12 having an outside diameter substantially equal to the inside diameter of the housing is supported on a portion of the base to subdivide the enclosure formed between the base and the housing into a housing enclosure 13 between one side of the mounting plate and the inside surface of the housing and a base enclosure 14 between the other side of the mounting plate and the inside surface of the base. Each of these enclosures is made fluid tight by means of O rings 15 disposed between the periphery of the mounting plate and the housing and between the base and the housing, respectively. A pressure connection (not shown) is fitted through the wall of the housing and through a passage (not shown) in the mounting plate to provide pressure communication between the base enclosure and an external source of pressure.

A connector 16 is fitted within an axial bore 12A in the center of the mounting plate so as to form a seal between its exterior and the wall of the mounting plate. The connector is a fitting having a central longitudinal bore 17. A pressure responsive capsule 18, disposed within the base enclosure, is joined to an end of the connector projecting from one side of the mounting plate. The capsule is of the type well known to the art and comprises a shell formed of a material which deforms in response to pressure variations. The capsule is joined to the connector so that its interior is sealed from the base enclosure but is in flow communication with the housing enclosure through the central bore in the connector. An overstop screw 19 is fitted within the connector bore and projects partially into the interior of the capsule. The overstop screw prevents stressing of the capsule beyond its elastic limit by limiting deflection of the capsule to a maximum valve.

Within the housing enclosure an L-shaped bracket 20 is rigidly jointed to the face of the mounting plate adjacent to the point where the connector opens into the housing enclosure. A cross-flexure 21 is joined to the bracket through a fixed block 22 which is elevated from the face of the mounting plate. A floating block 23 is joined to the fixed block by flat springs 24, 25 so as to be suspended thereby. Both the fixed block and the floating block are substantially identical in shape. Each is a substantially rectangular block having wedge-shaped truncations in opposite parallel sides. The fixed and floating blocks are inverted with respect to each other so that the inclined surfaces of their respective truncations converge toward a common point. One flat spring is joined at opposite ends to the bottom (as viewed in Fig. 1) inclined portion of the fixed block and the upper inclined portion of the floating block, respectively. The other flat spring is oppositely joined so that a cross-flexure of two juxtaposed flat springs is obtained. Each of the flat springs is made as stiff and as light as possible by the proper selection of cross sectional area to minimize responses to vibration and acceleration. A mass 26 is joined to the floating block so that the mass and the floating block act together as a balancing mass. The center of gravity of this balancing mass and the center of gravity of the pressure capsule are on opposite sides of the crossing point of the flat springs forming the cross-flexure.

A support piece 27 is joined as by screws 27A to one side of the floating block. The support piece is a rectangular bar elevated from the mounting plate and extending parallel to it from the floating block to a point above the approximate center of the connector bore. A wiper arm support 28 formed from a sheet metal channel is joined, as by screws 28A, to a vertical side of the support piece and extends collinearly toward the edge of the mounting plate. A layer of electrical insulating material 29 separates the wiper arm support from the support piece. A wiper arm extension 30 comprising a pointer of sheet material is joined to the wiper arm support as a collinear extension. An electrical contact pad 31 is fixed to the end of the wiper arm extension.

A potentiometer bracket 32, formed in the shape of a square U from a massive block of material, is joined through one leg of the U to the mounting plate so that it is positioned adjacent the end of the wiper arm extension. A layer of the insulating material 33 separates the potentiometer bracket from the face of the mounting plate so that the effect of thermal transients is minimized. A resistance wire coil 34, wound on an anodized aluminum mandrel 35, is fixed normal to the surface of the mounting plate by joining the ends of the mandrel to opposite legs of the potentiometer bracket. The use of an anodized aluminum mandrel permits dissipation of heat from the coil even under vacuum conditions. The resistance wire coil is thereby positioned so that the contact pad affixed to the end of the wiper arm extension is held in slidable contact with the coil. Suitable electrical connections (not shown) to the ends of the resistance wire coil and to the wiper arm extension are made to provide a potentiometric system.

A force arm 36 is joined by screw 36A to the face of the end of the support piece projecting over the connector bore, as particularly shown in Fig. 3. At its other end the force rod is joined to the interior wall of the pressure responsive capsule. In this manner, deflections of the pressure capsule are transmitted to the wiper arm extension and produce a displacement of the electrical contact pad relative to the resistance wire coil. The crossing point of the flat springs of the cross-flexure is the pivot point for movements of the wiper arm system responsive to pressure-induced deflections of the capsule.

Where, however, the mass of the pressure capsule is moved by a force, such as acceleration, which acts equally upon the balancing mass, the movement of the capsule acting to displace the wiper arm extension is counterbalanced by a movement of the balancing mass. Displacement of the contact pad relative to the resistance wire coil is thereby minimized. The positions of the balancing mass with respect to the pivot point therefore acts together with the cross-flexure to provide a minimum response to acceleration and vibrational environments. In addition, excellent wiper arm linearity is achieved where pressure-induced deflections of the capsule occur.

A cover 37 is joined as by welding to the mounting plate so as to enclose the operative elements within the housing enclosure. This cover is utilized when the transducer is used to measure absolute pressures and provides a convenient means for forming a leak-proof evacuable inner chamber. Where used as an absolute gage, the inner chamber formed by the cover and, as a result, the interior of the capsule, are evacuated and sealed.

Where used as a differential or gage transducer, cover 37 is not used. As a differential transducer, a second source of varying pressure and chamber 13 are connected through a pressure fitting (not shown). Through the bore in the connector, this pressure acts upon the interior of the capsule. As previously described, a first source of varying pressure acts externally of the pressure capsule so that the capsule is subjected to a differential pressure.

With reference to Figs. 4 and 5, another embodiment of the cross-flexure for use in the transducer according to the invention is shown. A fixed block 40 is rigidly joined to a bracket 41. The bracket is joined to the mounting plate as described in conjunction with Fig. 1. A floating block 42 is suspended from the fixed block by flat springs 43, 44. The fixed block and the floating block are identical in structure to those described in conjunction with Figs. 1 and 2. As particularly shown in Fig. 5, each of the flat springs has an intermedial arcuate recess in one side. The ends of each spring have substantially the same width as the floating and fixed blocks. One end of spring 43 is joined to the bottom inclined surface of the fixed block and the other end is fixed to the top inclined surface of the floating block. Spring 44 is joined at its opposite ends to the top inclined surface of the fixed block and the bottom inclined surface of the floating block. By reason of the arcuate recesses, the springs intermesh at a crossing point intermediate between the blocks. The principal advantage of this embodiment of the cross-flexure is that added structural strength is gained in that a maximum mating surface is utilized in joining the springs to the respective blocks. To avoid direct heating of the springs, pads 45 are placed over the portion of each spring mating with the blocks and spot welded to affix the springs to the blocks. The embodiment of the cross-flexure herein described acts to flexibly support the floating block and is joined to the wiper arm system to pivot it in the manner described in conjunction with the cross-flexure shown in Fig. 1.

The arrangement shown in Figs. 6 and 7 provides improved resistance to lateral displacement of the lever arm from its pivot axis when the instrument is subjected to high acceleration forces in a direction that tends to lift the arm out of the plane in which it normally pivots. The apparatus shown in Fig. 6 is similar to that of Fig 2 in that it includes a cover 52 secured to one face of a mounting plate 53, and a pressure sensitive capsule 54 (Fig. 7) secured to the opposite face of the mounting plate. However, the instrument of Figs. 6 and 7 differs in that it includes first and second pairs of cross-flexure supports 56 and 58, respectively, mounted on opposite sides of an elongated wiper arm 60 having a contact pad 62 secured at its left (as viewed in Fig. 6) end to sweep along a potentiometer coil winding 63 (Fig. 7). A force arm 64 (Fig. 7) is connected at its lower end to the lower interior wall of the pressure sensitive capsule. The force arm extends up through an opening (not shown) in the plate 53 and is connected at its upper end to the intermediate portion of the wiper arm.

An L-shaped bracket 65 is secured to the upper face of the mounting plate, and carries first and second fixed blocks 66, 68, respectively, located on opposite sides of a slot 70 through the bracket 65 and extending in a plane perpendicular to that of Fig. 6 to permit lateral movement of the wiper arm 60 in that direction. Each of the fixed blocks 66, 68 is identical with the fixed block 22 shown in Fig. 1. The wiper arm 60 extends through the slot 70, and terminates at its right end in an externally threaded projection 72, onto which is threaded a counterbalance weight 74, which holds an annular counterbalance shim 76 against the face of a pair of laterally extending floating blocks 78 formed integrally with the wiper arm 60. Each block 78 is of a shape similar to that shown for the floating block 23 in Fig. 1.

An upper (as viewed in Fig. 6) spring 80 is secured across the near inclined face of the fixed block 68, and is secured across the far inclined face of the upper floating block. A lower spring 88 is secured at its right end across the near inclined face of the upper floating block, crosses under the upper spring 80, and is secured across the far inclined face of the fixed block 66. Springs 80 and 88 are similar to those shown in Fig. 5, in that each of them includes an intermediate arcuate recess 89 in the intermediate parts of their adjacent edges so that the springs intermesh at their crossing point between the fixed and floating blocks. Upper and lower springs 90 and 92 are secured in a similar fashion to the inclined surfaces of fixed blocks 68 and floating block 90.

The crossing points of the two pairs of springs determines the pivot axis 94 (Fig. 6) about which the wiper arm 60 pivots in a plane normal to that of the drawing of Fig. 6. The symmetrical arrangement of the pairs of crossed springs on opposite sides of the wiper arm cancel any tendency for the wiper arm to be displaced in any direction other than pivoted about the desired axis 94, thus eliminating hammering of the contact 62 against the potentiometer coil winding. For example, the dual support for the wiper arm prevents the lateral displacement of the wiper arm about an axis 95, shown in Fig. 6 as perpendicular to the desired axis of rotation 94. In practice, the arrangement shown in Figs. 6 and 7 has proved so successful that no artificial means has been needed to restrain the movement of the contact off of the potentiometer coil winding for any forces yet encountered in aircraft and missile work. Moreover, the improved structure shown in Figs. 6 and 7, as applied to potentiometer pressure pickups, has resulted in the ability of the instrument to operate in more severe environments for longer periods of time with less deterioration than any other instrument with which I am presently familiar.

It is apparent that modifications may be made in the embodiments of the pressure transducer of the invention described herein without departing from the basic concept of the invention. For example, a larger range of pressure measurement may be achieved through the use of a second pressure desponsive capsule serially joined to the first pressure responsive capsule. In operation, the two pressure capsules respond in a manner identical to the action of the one previously described.

The pressure transducer according to the invention is particularly useful for sensitive control operations, particularly for in-flight applications. A low vibration response is achieved consistent with a pivoting flexure system involving no sliding or wearing contact. In addition, the thermal response is low since the use of a mounting plate upon which all elements are mounted provides a temperature sink. Since the displacement sensing means is isolated from the medium to be measured, the actuating elements are contacted only by a reference medium or a substantially vacuum condition. In this manner, the life of the instrument is prolonged. These aspects of the transducer combine to make it particularly useful where structural configurations make access to control instrumentation difficult.

I claim:

1. A pressure sensing transducer comprising a housing, pressure responsive means mounted in the housing for displacement in response to pressure changes, displacement sensing means, a lever arm in displaceable relationship relative to the displacement sensing means, means operable to transmit a force to the lever arm responsive to displacement of the pressure responsive means, a first pair of crossing springs connected at one end to rigid support means and at their opposite end to one side of the lever arm to suspend the arm for movement about a pivot axis in opposition to the first pair of supporting springs, a second pair of crossing springs connected at one end to rigid support means and at their opposite end to the other side of the lever arm to suspend the arm for movement about the pivot axis in opposition to the second pair of supporting springs and cooperate with the first pair of springs to resist lateral movement of the arm from its pivot axis, and a balancing mass respectively being on opposite sides of the crossing point of the springs.

2. Apparatus in accordance with claim 1 wherein the springs in each pair are juxtaposed flat springs.

3. Apparatus in accordance with claim 1 wherein the springs in each pair are flat springs having a width substantially equal to the width of the support means and an intermediate recess on one side to permit interlacing of the springs of each pair at their crossing point.

4. Apparatus in accordance with claim 1 wherein the displacement sensing means is a potentiometer.

No references cited.